April 18, 1933.  F. A. HAYES  1,904,046
VARIABLE SPEED POWER TRANSMISSION MECHANISM
Filed Oct. 9, 1930  2 Sheets-Sheet 1

INVENTOR
F.A. HAYES
BY ATTORNEYS
Cooper, Kerr & Dunham

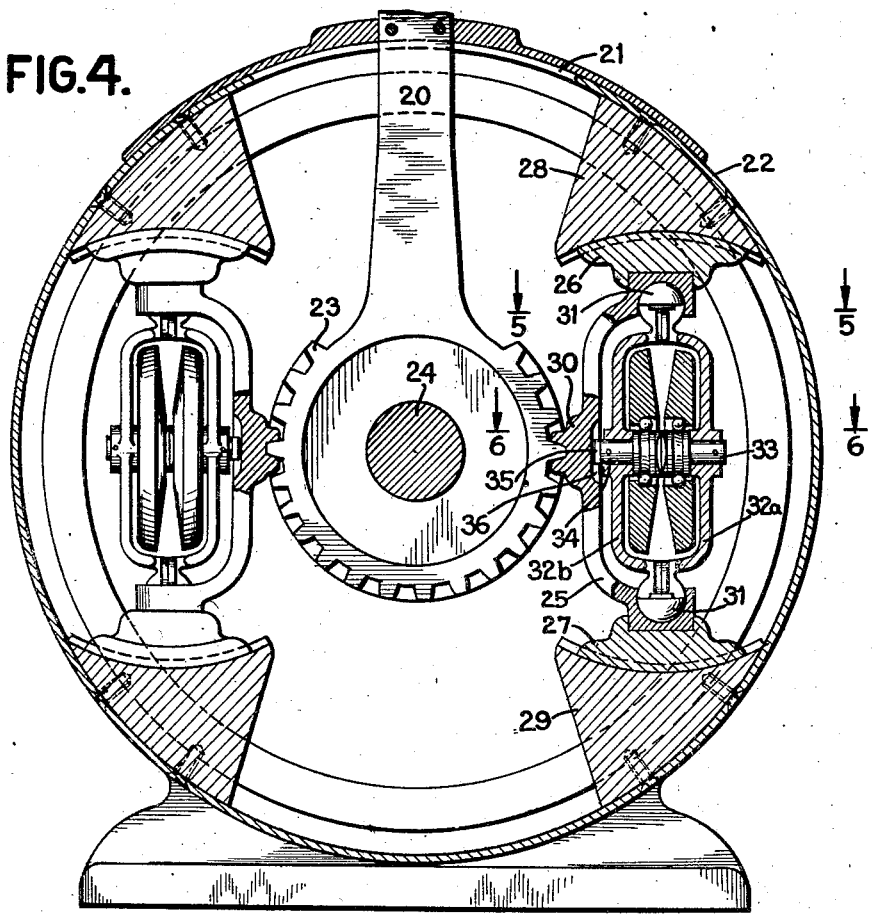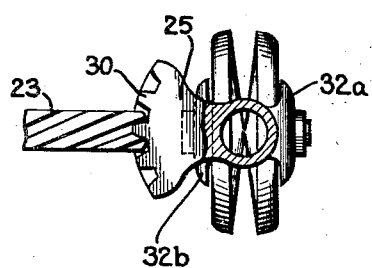

Patented Apr. 18, 1933

1,904,046

UNITED STATES PATENT OFFICE

FRANK A. HAYES, OF MIDDLETOWN, NEW JERSEY

VARIABLE SPEED POWER TRANSMISSION MECHANISM

Application filed October 9, 1930. Serial No. 487,452.

This invention relates to variable speed power transmission mechanisms of the type having coaxial, toroidally grooved friction disks and interposed friction rollers cooperating with the toroidal surfaces to transmit power from one disk to the other, with provision for varying the speed ratio between the driving and driven elements by rocking adjustment of the rollers on axes transverse to their axes of rotation. In a mechanism of this type the capacity of the apparatus in power transmitted depends, other conditions being the same, upon the number of rollers employed between the disks, and it is evident that with disks and grooves of given diameters the rollers, which for practical reasons are arranged equiangularly around the axis of the disks, can not be increased in number indefinitely. If the mechanism is to have a reasonable speed ratio variation, say from 1/3 to 4/1 or 3/1, the space available in the torus for the rollers and their carriers and the carrier supports limits the number to four or five at most, and in fact three is in most cases the maximum. I have, however, devised a roller system which will permit the number of rollers to be doubled, thus increasing the capacity of the transmission correspondingly. This I accomplish by providing two rollers side by side at each point and mounting the rollers in such manner that they can rock or be rocked to a certain extent independently of each other. The two rollers can then take correspondingly different angles to the axis of the disks, so that although their peripheral velocities are different there is no slip between them and the disks with which they cooperate.

The invention will be more easily understood when explained in connection with the accompanying drawings, in which Figs. 1 and 2 are diagrammatic views illustrating in longitudinal section the principle of my invention. It will be observed in Fig. 2 that rollers 14, 15 make similar but unequal angles to the disk axis, as do also rollers 16, 17, but that the two pairs make opposite angles to the disk axis, rollers 14, 15 being inclined upwardly toward the right and rollers 16, 17 downwardly toward the right.

Fig. 4 is a cross section on a plane corresponding to that indicated by line 4—4 of Fig. 1, showing a convenient and effective mounting for the duplex rollers.

Fig. 5 is a detail sectional plan view on line 5—5 of Fig. 4.

Fig. 6 is a detail plan view of the studs on which the paired rollers are mounted for rotation, on line 6—6 of Fig. 4.

Figure 1:
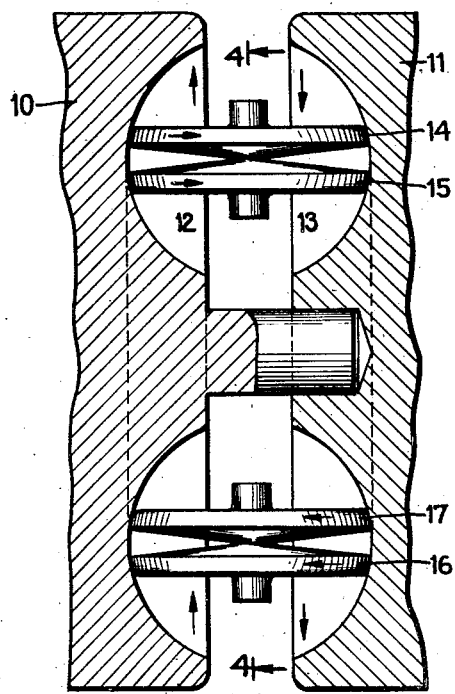

Referring to Fig. 1, 10 and 11 are two coaxial disks having toroidal grooves 12, 13 in their inner or opposed faces. 14, 15 and 16, 17 are friction rollers associated in pairs to cooperate with the surfaces of the grooves in the disks. The inner or opposing faces of the rollers are conical, as indicated. When the rollers are in the position shown in Fig. 1, with their axes of rotation perpendicular to the axis of the disks, and assuming that 11 is the driving and 10 the driven disk, the angular speeds of the disks are equal. If, now, the rollers are turned to a position such as that indicated in Fig. 2, making the radius $R_1$, between the axis $a$—$a$ of the disks and the point of contact of roller 15 on disk 10 equal to the radius $r_1$ of the point of contact of roller 17, and radius $R_2$ equal to the radius $r_2$, then disk 10 will be driven at a speed higher than that of disk 11. If at the same time radii $R_1$, $R_2$, $R_3$, $R_4$, are such that $$R_1/R_2 = R_3/R_4,$$

then there will be no slip between any roller and either disk. In order to obtain the radius values necessary to satisfy the above equation the rollers are made conical as indicated in the figure, so that their axes of rotation can take different angles to the axis of the disks.

It is possible to provide mechanism for rocking the rollers in both directions (clockwise and counterclockwise as viewed in Figs. 1 and 2) and at the same time keep $R_1/R_2$ equal to $R_3/R_4$ at each speed ratio position, but it will be evident upon reflection that such mechanism must be of the highest accuracy in construction and in operation, since if one roller is even slightly out of the correct position its peripheral velocity will be different from the velocity of one disk or the other at the point where the disk and roller are in contact, with resulting wear on roller or disk or both. I therefore prefer to mount the rollers in such manner that they will automatically take the correct relative positions when rocked to a new speed ratio position. For this purpose I make use of the "precession" principle embodied in the mechanism described and claimed broadly in my prior patent, No. 1,698,229, issued January 8, 1929. Reference may be made thereto for a more complete or detailed explanation of the principle which may be briefly explained as follows.

Figure 2:
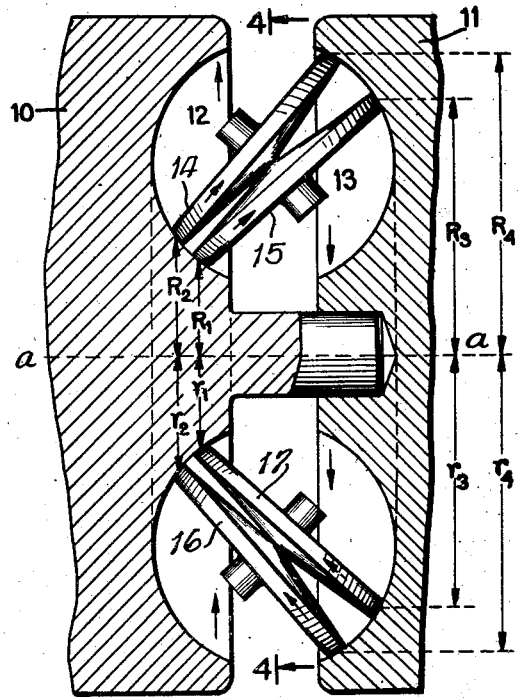
Figure 3:
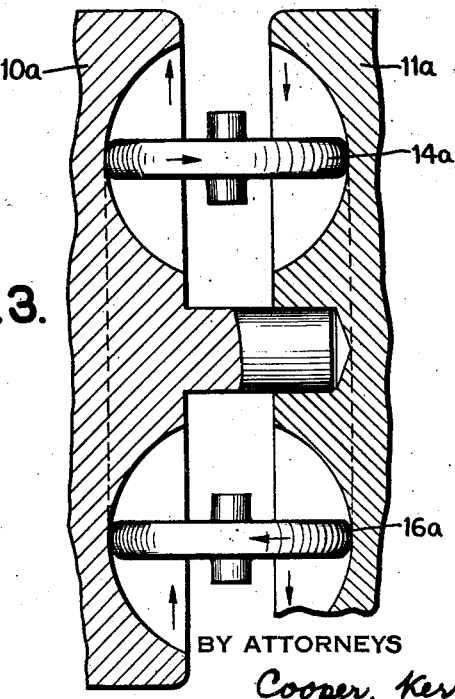
Fig. 3 is a diagrammatic view similar to Figs. 1 and 2 but showing the use of single rollers.

In Fig. 3 single rollers are shown. Assuming that the axes of the two rollers $14a$, $16a$ intersect the axis of the disks $10a$, $11a$, that is, assuming that the roller axes are coplanar with the axis of the disks, then if roller $14a$ is shifted bodily upward from the plane of the figure and roller $16a$ is shifted bodily downward, the former will begin to rock counterclockwise on an axis perpendicular to its axis of rotation and the other roller, $16a$, will rock clockwise on a like axis. Similarly, if roller $14a$ is depressed and roller $16a$ is raised, roller $14a$ will rock clockwise and the other counterclockwise. In this way, merely by shifting the rollers transversely to their axes of rotation, the frictional forces existing between the rollers and one or both of the cooperating disks serve to rock the rollers to higher or lower speed ratio positions, as the case may be. This rocking movement is conveniently termed "precession" in my prior patent referred to, and the axes on which the rollers rock or swing are called axes of precession. If, now, rollers 14—15 and 16—17 in Figs. 1 and 2 are shifted in like manner, each of the four will behave like rollers $14a$, $16a$, with this difference, however: as rollers 14 and 15, for example, "precess" they do not rock equally. On the contrary, as the rollers rock counterclockwise the edges which are moving outwardly on disk 11 swing apart, the outer edge of roller 14 outrunning that of roller 15 and causing the two rollers to take positions inclined to each other as indicated generally in Fig. 2. The same effect is produced on rollers 16 and 17. This spreading effect or differential rocking movement is due to the thrusts tending to precess the two rollers, these thrusts being different because the outwardly moving points of contact (of the rollers on the disks) are at different radial distances from the axis of the disks. In this explanation it is assumed that both disks are rotating and that the rollers are non-planetary, that is, that the rollers do not revolve around the axis of the disks, but upon reflection it will be evident that the same effects are produced, that is, precession and angular spreading of the rollers, when the rollers are of the planetary type. An important effect of the spreading action is that the rollers equalize themselves, so to speak; that is, they automatically take different angular positions such that the equations $R_1/R_2 = R_3/R_4$ and $r_1/r_2 = r_3/r_4$ are satisfied at all points in the precessional adjustment to higher or lower speed ratio positions.

To obtain this automatic equalization, in which the rollers rock relatively to each other on the apexes of their conical inner faces, they are mounted so that as they precess they can shift themselves (transversely of their axes of rotation) independently of each other. For this purpose the carrier for each pair of rollers is split longitudinally into two parts so that the two can shift relatively to each other as one roller precesses more than the other. The two-part carrier for a pair of rollers may of course be considered as two carriers mounted in the same support.

Various mechanisms can be employed to effect the initial shifting adjustment of the rollers and control the resulting precession, as for example mechanisms such as disclosed in my prior Patent No. 1,698,229, above mentioned. Or the precession may be initiated by tilting the roller carriers in a plane transverse to the axis of the disks. A simple mechanism for thus tilting the rollers is shown in my copending application, Serial No. 463,876, and I have selected the mechanism there described for specific description herein as a convenient and effective means for the purpose.

Referring now to Fig. 4, which is a cross section of the mechanism on a plane midway between the two disks, 20 is a control arm extending outwardly through a circumferential slot 21 in the housing 22 and connected at its inner end to a helical gear 23 which is mounted for rotary movement about the shaft 24. The rollers and roller carriers being exactly alike, it will suffice to describe in detail those shown in section at the right of the figure. As there shown, bracket 25 is rotatably mounted in upper and lower arc-shaped shoes 26, 27, shiftable in arc-shaped guides 28, 29, fixed to the housing 22, and on the bracket is a segmental helical gear 30 (see also Fig. 5) meshing with the helical gear 23. In the end of each arm of the bracket is a spherical recess containing a member 31, which is a sphere with one side flattened by slabbing off approximately half of the sphere. Between the two hemispheres is the split carrier, composed of two parts $32a$, $32b$, with their upper and lower ends fitted in the recesses in the bracket. The meeting surfaces at the ends of the two parts are beveled so that they contact with each other along knife edges as shown in Fig. 5 and are thus capable of rocking on said knife edges relatively to each other. The rollers are mounted by means of ball thrust-bearings on studs 33, 34, pinned in the carrier parts 32a, 32b, and beveled to form meeting knife edges as indicated in Fig. 6. These knife edges are aligned with those on the carrier halves and are slightly flatter than the latter so that the two rollers, rotating at different speeds, can approach each other closely in their differential rocking movement but can not come into actual contact. Stud 34 is flattened on each side at its end next to the bracket 25, to form a key 35 extending into a vertical groove 36 in the bracket 25 to permit vertical movement of the stud and carrier 32b without relative rocking movement.

Assuming that disk 10, Fig. 4, is rotating in the direction of the arrows, suppose the control arm is swung counterclockwise. Because of the powerful frictional resistance encountered by the rollers the brackets 25 do not rotate in the shoes 26, 27. Instead, the bracket at the right is tilted clockwise and the other counterclockwise, the arc-shaped shoes sliding in their respective guides 28, 29. Since the two rollers are on opposite sides of the center about which the bracket tilts (which center is the center of the arc-shaped shoes and guides) roller 15 is raised slightly and roller 14 is depressed slightly, the two halves of the carriers sliding on their contacting knife edges. Rollers 14 and 15 now begin to precess counterclockwise (as seen from above) and rollers 16, 17 begin to precess clockwise on their axes of precession, which coincide with the knife edges on which the carriers contact with each other as in Fig. 5. As rollers 14, 15 precess, the resulting rocking movement of the helical segmental gear 30, meshing with the helical gear 23, has the effect of screwing the bracket back from its tilted toward its normal (vertical) position. As this restoring movement takes place roller 15 descends and roller 14 rises, the two being on opposite sides of the center about which the bracket tilts as stated above. These relative movements would not, however, be always equal, except for the spherical equalizer 31. Thus if carrier 32b, for example, tends to descend, it can do so only by rocking the spherical equalizers, which in turn shift the other carrier 32a in the opposite direction. Thus no shifting movement of either can occur without a compensating movement of the other. Hence, as the downwardly moving roller 15 (in the described counterclockwise restoring movement due to the screw action of the helical gears incident to the precession of the rollers) approaches its equilibrium position, in which its axis of rotation intersects the axis of the disks, roller 14 must move up to its equilibrium position and cease precessing simultaneously with roller 15. The two may thus be said to float in the bracket, and their automatic compensation, by which the rollers equalize the relative shifting movements of their respective halves of the carriers, takes place in spite of any slight inaccuracies of manufacture or fitting of the parts. It will be evident that the rollers of the other pair operate in like manner.

It is to be understood that the invention is not limited to the specific mechanism herein described but can be embodied in other forms without departure from its spirit. I do not claim the helical gear mechanism broadly herein but do so in my copending application Serial No. 463,876, above mentioned.

I claim—

1. In a variable speed power transmission mechanism, in combination, coaxial friction disks having toroidal grooves in their opposed faces, a plurality of pairs of friction rollers between the disks and cooperating with the grooves therein, a pair of carriers for each pair of rollers adapted to rock on an axis transverse to the axes of rotation of the rollers and enabling the rollers of each pair to rock relatively to each other on said axis, and supports for said carriers in which the carriers of each pair are mounted for relative longitudinal movement.

2. In a variable speed power transmission mechanism, in combination, coaxial friction disks having toroidal grooves in their opposed faces, a plurality of pairs of friction rollers between the disks and cooperating with the grooves therein, a pair of carriers for each pair of rollers adapted to rock on an axis transverse to the axes of rotation of the rollers and enabling the rollers of each pair to rock relatively to each other on said axis, supports for said carriers in which the carriers of each pair are mounted for relative longitudinal movement, and means for moving the roller carriers to cause precession of the rollers of each pair to vary the speed ratio of the mechanism.

3. In a variable speed power transmission mechanism, in combination, coaxial friction disks having toroidal grooves in their opposed faces, a plurality of pairs of friction rollers between the disks and cooperating with the grooves therein, a pair of carriers for each pair of rollers adapted to rock on an axis transverse to the axes of rotation of the rollers and enabling the rollers of each pair to rock relatively to each other on said axis, supports for said carriers in which the carriers of each pair are mounted for relative longitudinal movement, means for causing precessional movement of the rollers of each pair to vary the speed ratio of the mechanism, and means cooperating with each pair of carriers to cause equal and opposite longitudinal movements of such carriers as the rollers precess.

4. In a variable speed power transmission mechanism, in combination, coaxial friction disks having toroidal grooves in their opposed faces, a plurality of pairs of precessing friction rollers between the disks and cooperating with the grooves therein, a pair of carriers for each pair of rollers adapted to rock on the axis of precession of the respective rollers and enabling the rollers of each pair to precess relatively to each other, supports in which the carriers of each pair are mounted for relative longitudinal movement, and means cooperating with each pair of carriers to control the said relative longitudinal movements of the carriers.

5. In a variable speed power transmission mechanism, in combination, coaxial friction disks having toroidal grooves in their opposed faces, a pair of friction rollers arranged side by side on the same side of the axis of the disks and cooperating with the grooves therein, carriers for the rollers, capable of simultaneous differential rocking movement on an axis transverse to the axes of rotation of the rollers, supporting means in which said carriers are mounted for said rocking movement and for relative longitudinal movement, and means cooperating with the carriers to cause the longitudinal movements thereof to be opposite in direction and equal in extent.

6. In a variable speed power transmission mechanism, in combination, coaxial friction disks having toroidal grooves in their opposed faces, a pair of friction rollers arranged side by side on the same side of the axis of the disks and cooperating with the grooves therein, carriers for the rollers, capable of simultaneous differential rocking movement on an axis transverse to the axes of rotation of the rollers, supporting means in which said carriers are mounted for said rocking movement and for relative longitudinal movement, means cooperating with the carriers to cause the longitudinal movements thereof to be opposite in direction and equal in extent, and means for actuating the carriers to vary the speed ratio of the mechanism.

7. In a variable speed power transmission mechanism, in combination, coaxial friction disks having toroidal grooves in their opposed faces, a pair of friction rollers arranged side by side on the same side of the axis of the disks, cooperating with the grooves therein and adapted for differential precessional movement to vary the speed ratio of the mechanism, carriers for the rollers, capable of differential rocking movement on an axis transverse to the axes of rotation of the rollers as the latter precess, supporting means in which said carriers are mounted for said differential rocking movement and for relative longitudinal movement, means cooperating with the carriers to cause said longitudinal movements thereof to be opposite in direction and equal in extent, and means operable at will to cause speed-varying precession of the rollers.

8. In a variable speed power transmission mechanism, in combination, coaxial friction disks having toroidal grooves in their opposed faces, a pair of friction rollers arranged side by side on the same side of the axis of the disks and cooperating with the grooves therein, roller carriers capable of differential rocking movement on an axis transverse to the axes of rotation of the rollers, and supporting studs for the rollers, non-rotatably mounted in said carriers.

9. In a variable speed power transmission mechanism, in combination, coaxial friction disks having toroidal grooves in their opposed faces, a pair of friction rollers arranged side by side on the same side of the axis of the disks and cooperating with the grooves therein, roller carriers capable of differential rocking movement on an axis transverse to the axes of rotation of the rollers, supporting studs for the rollers, non-rotatably mounted in said carriers, supporting means in which the carriers are mounted for said differential rocking movement and for relative longitudinal movement, and means carried by said supporting means and cooperating with the carriers to cause the longitudinal movements thereof to be opposite in direction and equal in extent.

10. In a variable speed power transmission mechanism, in combination, coaxial friction disks having toroidal grooves in their opposed faces, a pair of friction rollers arranged side by side on the same side of the axis of the disks and cooperating with the grooves therein, roller carriers capable of differential rocking movement on an axis transverse to the axes of rotation of the rollers, and supporting studs for the rollers, non-rotatably mounted in said carriers, said studs having knife-edge inner faces in contact at the axis on which the carriers rock.

11. In a variable speed power transmission mechanism, in combination, coaxial friction disks having toroidal grooves in their opposed faces, a pair of friction rollers arranged side by side on the same side of the axis of the disks and cooperating with the grooves therein, roller carriers capable of differential rocking movement on an axis transverse to the axes of rotation of the rollers and having journals provided with knife-edge faces in contact at said axis, supports in which said journals are mounted for said rocking movement of the carriers, and supporting studs for the rollers, non-rotatably mounted in said carriers and having knife-edge faces in contact at said axis on which the carriers rock.

12. In a variable speed power transmission mechanism, in combination, a pair of coaxial friction disks each having a toroidal groove in its inner face, a pair of rotatable friction rollers arranged side by side between the disks and each cooperating with both grooves therein, individual supports for the rollers, adapted to rock separately on an axis transverse to the axes of rotation of the rollers, and supporting means for the said supports.

In testimony whereof I hereto affix my signature.

FRANK A. HAYES.